APPARATUS FOR GENERATING FINE LINE, DISCRETE TRACKS

Filed Jan. 28, 1966 2 Sheets-Sheet 1

INVENTORS
FRANZ UCKO
DURWOOD L. AIRHART

BY Cushman, Darby & Cushman
ATTORNEYS

APPARATUS FOR GENERATING FINE LINE, DISCRETE TRACKS

Filed Jan. 28, 1966 2 Sheets-Sheet 2

INVENTORS
FRANZ UCKO
DURWOOD L. AIRHART

BY Cushman, Darby & Cushman
ATTORNEYS

United States Patent Office 3,457,012

Patented July 22, 1969

3,457,012

APPARATUS FOR GENERATING FINE LINE, DISCRETE TRACKS

Franz Ucko, St. Paul, and Durwood L. Airhart, Maplewood, Minn., assignors to Control Data Corporation, South Minneapolis, Minn., a corporation of Minnesota Filed Jan. 28, 1966, Ser. No. 523,785

Int. Cl. G03b 27/10

U.S. Cl. 355—103 4 Claims

ABSTRACT OF THE DISCLOSURE

Apparatus and method employed in producing a plurality of discrete track films or layers of material on a substrate. A beam of electromagnetic energy is passed through a beam dividing means having a wedge-shaped array of apertures to produce a plurality of beams. A photosensitive plate is moved in a predetermined manner to be exposed to these beams. The exposed plate is then developed to serve as a master suitable for use in a photomechanical transfer process.

This invention generally relates to an improved apparatus and method for producing a plurality of discrete track films or layers of material on a substrate or blank. Further, this invention relates to an improved apparatus and method for producing a plurality of arbitrary patterns, precision fine-line rulings or discrete track films.

As the need for providing a large amount of computer memory in a small physical space increases (such as, in space vehicles or the like), the need for high density memores increases. A plurality of high density memory tracks on disk or drum-type memories can fulfill this need.

This invention employs a photomechanical track image transfer approach in order to improve performance and density of discrete track memory films. This normally requires a master plate which is suitable for the photomechanical transfer process.

In order to understood the expense and time involved in obtaining such a master plate it will be of interest to compare the present day technique with the approach to the problem. The prior art method of generating concentric circle, precision fine-line rulings is practiced at four or five loactions in the United States and at a similar number of places in the rest of the world (Germany, England, Japan). The process of fabricating such rulings is based on a precision turntable and a screw directed diamond scribing tool. (Equipment of this kind has to be custom built and costs run in excess of $50,000.00.) An acid resist wax coating (formulations are jealously guarded trade secrets) is spread over the surface of some ultraflat glassplate. The glassplate is placed on the turntable and the scribing tool, programmed for the required line frequency, scribes each line into the wax coating thus exposing the glass surface. Depending on the line frequency and the width of such a ruling, the total time to complete a ruling may take a number of days of continuous operation. Following the scribing cycle the exposed glass surfaces are etched and after removing the wax coating acid resist the shollow etched tracks are filled with an opaque substance. It is interesting to note that very fine lines are easier to fill than wider lines. This fact is due to the etching ratio, reflected in the depth of the etched lines and the undercutting of the etched line reflected in the sharpness or raggedness of the edge of such lines. Due to the shallow (.0001″–.0002″) depth of the etched lines the filling material usually does not completely cover over the centers of wider lines. Obviously any photographic reproductions of these masters record these flaws and a tedious job of repairing the duplicate ruling further adds to the time of fabricating a usable master. Needless to say, the cost of such a master runs into many thousands of dollars.

From the above description of prior art devices it can be seen one line at a time is cut. This obviously results in a great expediture of time.

Accordingly, it is one object of the invention to provide a scribing system which generates the entire pattern in one operation.

It should be emphasized that although this invention will be described in relation to the production of concentric magnetic memory tracks upon a disk by a photomechanical transfer approach, the teachings of this invention extend to the production of tracks of material (other than magnetic) upon other shapes (other than disks; such as drums) by other approaches than strictly photomechanical, as will be seen more clearly hereinafter.

One of the broader objects of the invention is to provide an improved apparatus and method for producing a plurality of discrete, precision fine-line tracks of arbitrary pattern on a disk or blank.

Another object of the invention is to provide an improved apparatus and method for producing a plurality of concentric circle, discrete track films of high density on a photographic master plate suitable for a photomechanical transfer process.

It is a further object of the invention to produce a photographic master plate having a plurality of fine-line rulings thereon, economically and in a short period of time.

Other objects and advantages of this invention will become apparent to those of ordinary skill in the art upon reading the appended claims and the following detailed description of an illustrative embodiment of the invention, in conjunction with the drawings, in which:

FIGURE 1 refers to apparatus for producng a plurality of concentric high density lines on a photographic master plate;

Figure 1:
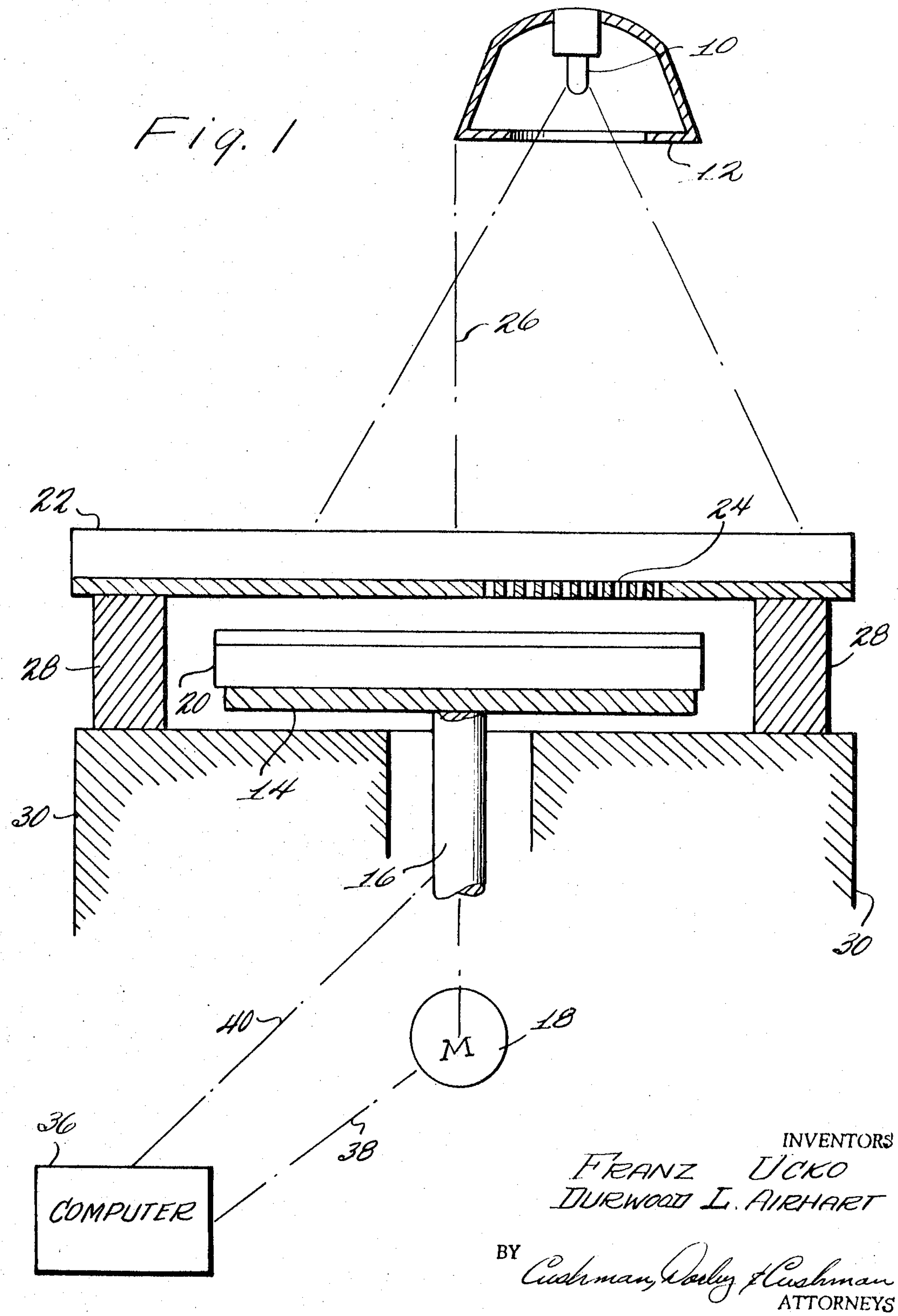

Referring to FIGURE 1, there is shown a point light source 10. A collimator 12 is also provided to insure a highly directional beam of light. There are many well-known ways for producing a directional beam of light, There are many well-known ways for producing a directional beam of light, and this invention may employ any of these methods.

A turntable plate support or disk 14 is provided, the turntable support being connected by a shaft 16 to a motor 18 which imparts rotation to the disk 14 via the shaft 16.

A photoemulsion plate 20 is secured to, or mounted on the turntable plate support 14. The plate 20 is light sensitive. Other materials may be used for the plate 20, depending on the frequency of the radiation emitted by source 10. That is, source 10 may be of infrared or ultraviolet or any other suitable electromagnetic wave length; and, therefore, the plate 20 would correspondingly be sensitive to and compatible with the particular frequency emitted at the source 10. Further, the plate 20 may be made of a photoresist material which would permit the light or electromagnetic wave scribing method of this invention to be applied directly to the disk blanks, provided photoresist materials become available with compatibly high reaction speeds to compatible light sources. This will be more evident from the following description of the invention.

Figure 2:
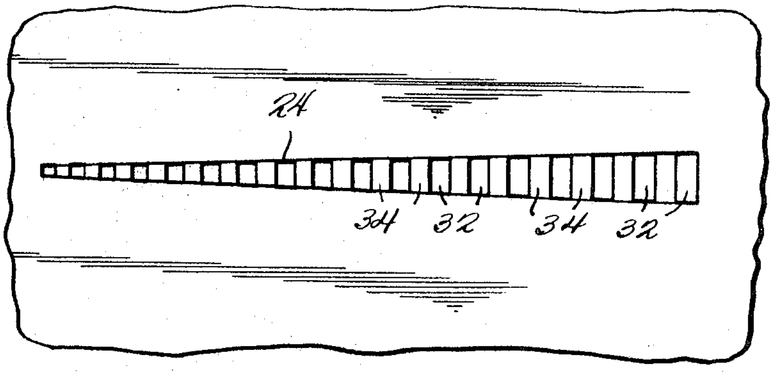
FIGURE 2 is an enlarged view of a portion of FIGURE 1.

A light orifice plate 22 is provided to divide the beam of light emitted by the source 10 into a plurality of fine beams which strike the surface of the plate 20. In FIGURE 2 there is shown a top view of an orifice or aperture portion 24 of the light orifice plate 22. The orifice portion is wedge-shaped, the apex of the wedge being located approximately at the central axis 26 of the turntable plate support 14. The orifice plate 22 is supported by member 28, which in turn is supported by member 30. The plate 22 does not rotate, and the supports 28 and 30 do not permit any light or other form of radiation to enter the chamber wherein the plate 20 is located.

Figure 3:
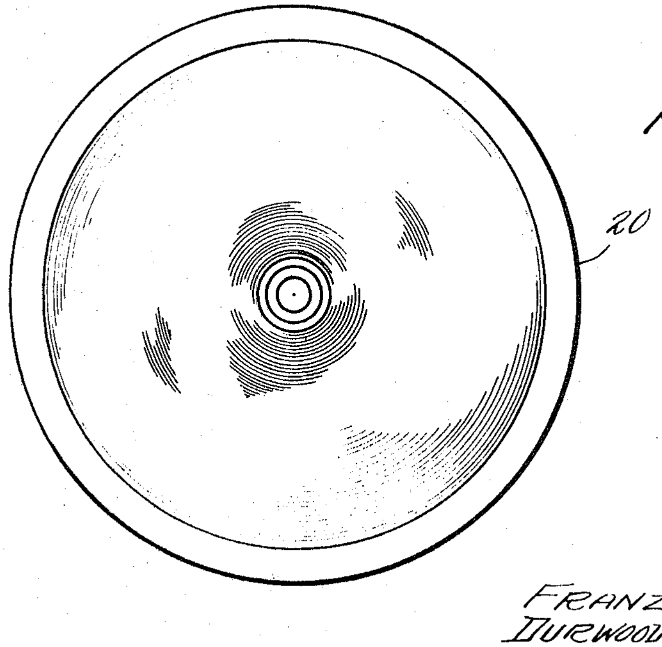
FIGURE 3 is a top view of a photographic master plate produced in accordance with the teachings of this invention.

Returning to the wedge 24, shown in FIGURE 2, alternate opaque and transparent portions are provided along the length of the wedge. For instance, at 32 slats are provided which are opaque to the radiation emitted by source 10, whereas at 34 orifices or apertures are provided which permit the radiation to pass therethrough. A photographic master plate as shown in FIGURE 3 will be produced from the beams passing through the orifices as will be described hereinafter.

In order to generate a fifty track per inch density of concentric rings on the continuous film recording surface of plate 20 the slats 32 are made 0.013 inch wide, whereas the orifices 34 are made 0.007 inch wide, the orifice width corresponding exactly to the spaces separating memory tracks, and the slat width. The spacing corresponding exactly to the widths of the tracks which result on the plate 20 as will be described hereinafter. A hundred track per inch density can be obtained by employing slats 0.005 inch wide and orifices also 0.005 inch wide. Further a two hundred and fifty track per inch density can be obtained by making both the slat and aperture widths 0.002 inch wide. Thus it can be seen that by varying the widths of the slats 32 and the orifices 34 of the aperture wedge 24, discrete track disk memory can be produced of any desired density.

Having now described the structure of an illustrative embodiment of the invention, its operation will now be described. An unexposed photographic dry plate 20, for example, is attached to the concentric turntable 14. Above the plate 20 the light orifice wedge 24 is suspended a short distance from the unexposed plate and parallel to its surface. The pinpoint light source 10 is positioned above the orifice wedge 24.

The turntable 14, together with the unexposed photo plate 20, is set into rotation. The light source 10 is next turned on, while the plate 20 is rotating underneath the wedge 24. Finally, the exposed photo plate 20 is removed from the turntable at the end of the cycle and developed, resulting in the master late shown in FIGURE 3.

The images on the master plate 20 may be transferred through photomechanical processing to disk file blanks and the tracks may be plated directly into the open spaces through photoresist masking, or for example, open areas may be etched off on a previously plated disk blank.

The same principle described above can be applied to other geometries where multiple scribing is applicable. For instance, referring to FIGURE 1, a computer 36 may be employed to direct both rotational and translational motion of the shaft 16 over appropriate linkages 38 and 40. By appropriately combining the rotational and translational motion of the shaft 16, any arbitrary pattern can be produced on the plate 20. Heretofore, fairly complicated apparatus has been employed to produce patterns of arbitrary shape on light sensitive materials employing cathode-ray tubes and elaborate control mechanisms therefor. This invention eliminates such complicated devices employed in prior art approaches to this problem by replacing them with the collimated light source 10, and the orifice wedge 24, together with the programmed computer 36 which controls the motion of the shaft 16, in accoradnce with the stored program instructions.

Thus there has now been described a light scribing apparatus and method which accomplishes the objects and advantages claimed therefor. Further, it should be appreciated that tracks of even higher density can be produced by reducing the size of the photographic master 20 in accordance with well-known photographic reduction principles.

Other objects and advantages, and even further modifications of the invention, will become apparent to those of ordinary skill in the art upon reading this disclosure. However, it is to be understood that this disclosure is illustrative of the invention, and not limitative thereof, the invention being defined by the appended claims.

What is claimed is:

1. Apparatus for generating a plurality of lines on a plate sensitive to electromagnetic wave energy, said apparatus comprising:

means for imparting motion to said plate;

a beam source of electromagnetic energy directed at said plate;

means for dividing said beam into a plurality of fine beams to thereby expose said plate to said plurality of fine beams and provide said lines on said plate, wherein said light beam dividing means includes a wedge-shaped array of apertures.

2. Apparatus as in claim 1 where said wedge-shaped array is spatially parallel to said plate and the apex of said wedge is located approximately at the central axis of said plate.

3. Apparatus as in claim 1 where said wedge-shaped array includes alternate opaque and transparent portions disposed along the length of said array.

4. Apparatus as in claim 1 where said motion imparting means includes a program controlled computer for regulating the motion of said plate.

References Cited

UNITED STATES PATENTS

| | | | |
|---|---|---|---|
| 3,155,505 | 11/1964 | Shannon | 95—73 XR |
| 3,181,419 | 5/1965 | Knaup et al. | 346—107 XR |
| 3,323,133 | 5/1967 | Armer et al. | 346—107 |
| 3,361,873 | 1/1968 | Johnson et al. | 352—103 XR |

NORTON ANSHER, Primary Examiner

R. L. MOSES, Assistant Examiner

U.S. Cl. X.R.

46—107; 352—103; 355—78